United States Patent [19]

Islam

[11] Patent Number: 5,664,036

[45] Date of Patent: Sep. 2, 1997

[54] HIGH RESOLUTION FIBER OPTIC PROBE FOR NEAR FIELD OPTICAL MICROSCOPY AND METHOD OF MAKING SAME

[75] Inventor: Mohammed N. Islam, Ann Arbor, Mich.

[73] Assignee: AccuPhotonics, Inc., Ann Arbor, Mich.

[21] Appl. No.: 542,437

[22] Filed: Oct. 12, 1995

Related U.S. Application Data

[63] Continuation-in-part of Ser. No. 322,210, Oct. 13, 1994, Pat. No. 5,485,536.

[51] Int. Cl.$^6$ .............................. G02B 6/26; G02B 21/00; G01N 23/00
[52] U.S. Cl. ...................... 385/31; 385/12; 385/15; 385/39; 385/43; 385/123; 385/127; 385/128; 385/901; 250/306; 250/311; 359/368
[58] Field of Search ..................... 385/15, 12, 27, 385/28, 31, 32, 33, 38, 39, 43, 49, 123, 128, 127, 133, 147, 901, 902; 606/16, 3; 250/306, 311; 359/368

[56] References Cited

U.S. PATENT DOCUMENTS

| | | |
|---|---|---|
| 4,604,520 | 8/1986 | Pohl ................................. 250/216 |
| 4,725,727 | 2/1988 | Harder et al. ................. 250/227.11 X |
| 4,917,462 | 4/1990 | Lewis et al. ........................ 359/368 X |
| 5,018,865 | 5/1991 | Ferrell et al. ............................ 356/376 |
| 5,105,305 | 4/1992 | Betzig et al. ............................ 359/368 |
| 5,138,159 | 8/1992 | Takase et al. ............................ 250/306 |

(List continued on next page.)

OTHER PUBLICATIONS

Reddick, R. C. et al., "New Form of Scanning Optical Microscopy" *Physical Review B*, vol. 39, No. 1, Jan. 1, 1989, pp. 767–770.

Corcoran, Elizabeth, "A Thin Line," *Scientific American*, Aug. 1990, pp. 98–100.

Reddick, R. C. et al., "Photon Scanning Tunneling Microscopy," *Rev. Sci. Instrum.*, vol. 61, No. 12, Dec. 1990, pp. 3669–3677.

Ferrell, T.L. et al., "Progress in Photon Scanning Tunneling Microscopy (PSTM)" *Ultramicroscopy*, vol. 42, No. 44, 1992, pp. 408–415.

Pangaribuan, Togar et al. "Reproducible Fabrication Technique of Nanometric Tip Diameter Fiber Probe for Photon Scanning Tunneling Microscope," *Jpn J. Appl. Phys.*, vol. 31, 1992, pp. L1302–L1304, Sep. 1, 1992.

Markoff, John, "I.B.M. Crammed With Data," *The New York Times*, Jun. 2, 1993.

Van Labeke, D. et al., "Probes for Scanning Tunneling Optical Microscopy: A Theoretical Comparison," *J. Opt. Soc. Am. A.*, vol. 10, No. 10, Oct. 1993, pp. 2193–2201.

Pangaribuan, Togar et al., "Highly Controllable Fabrication of Fiber Probe for Photon Scanning Tunneling Microscope," *Scanning*, vol. 16, 1994, pp. 362–367.

Bylinsky, Gene, "Genetics The Money Rush Is On," *Fortune*, May 30, 1994, pp. 94–108.

Corcoran, Elizabeth, "Storage Space," *Scientific American*, Oct. 1992, pp. 110–112.

*Primary Examiner*—Brian Healy
*Attorney, Agent, or Firm*—Harness, Dickey & Pierce, P.L.C.

[57] ABSTRACT

The near field optical microscopy probe has a conically tapered tip formed from the inner core of a fiber optic cable. The tapered tip protrudes longitudinally from the outer cladding and has a metallized optically opaque coating over all the tip except for the light-emitting aperture at the tip apex. The optical probe is manufactured by wet chemical etching. The protruding conical tip tapers at an acute angle on the order of about 15° to 60°, such that the tip length is on the order of a few wavelengths. By this construction, illumination traverses only a very small nonpropagating mode or evanescent mode region with resulting high optical efficiency. The probe and specimen may be supercooled, causing the metallized coating to be highly conductive and therefore optically opaque. The result is a high efficiency, high resolution probe suitable for such demanding applications as DNA sequencing.

37 Claims, 10 Drawing Sheets

U.S. PATENT DOCUMENTS

| | | | |
|---|---|---|---|
| 5,168,538 | 12/1992 | Gillespie | 385/123 |
| 5,254,854 | 10/1993 | Betzig | 250/234 |
| 5,272,330 | 12/1993 | Betzig et al. | 250/216 |
| 5,286,970 | 2/1994 | Betzig et al. | 250/227.26 |
| 5,286,971 | 2/1994 | Betzig et al. | 250/227.26 |
| 5,288,996 | 2/1994 | Betzig et al. | 250/227.26 |
| 5,288,997 | 2/1994 | Betzig et al. | 250/227.26 |
| 5,288,998 | 2/1994 | Betzig et al. | 250/227.26 |
| 5,288,999 | 2/1994 | Betzig et al. | 250/227.26 |
| 5,361,314 | 11/1994 | Kopelman et al. | 385/12 |
| 5,394,500 | 2/1995 | Marchman | 385/123 |
| 5,395,741 | 3/1995 | Marchman | 430/320 |
| 5,452,382 | 9/1995 | Shionoya et al. | 385/11 |
| 5,485,536 | 1/1996 | Islam | 385/31 |

Figure 7
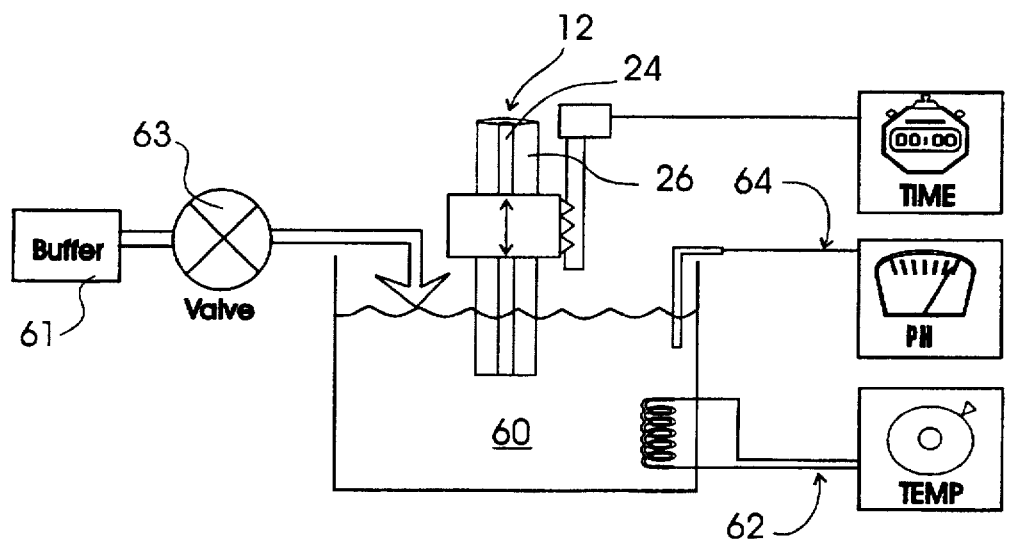
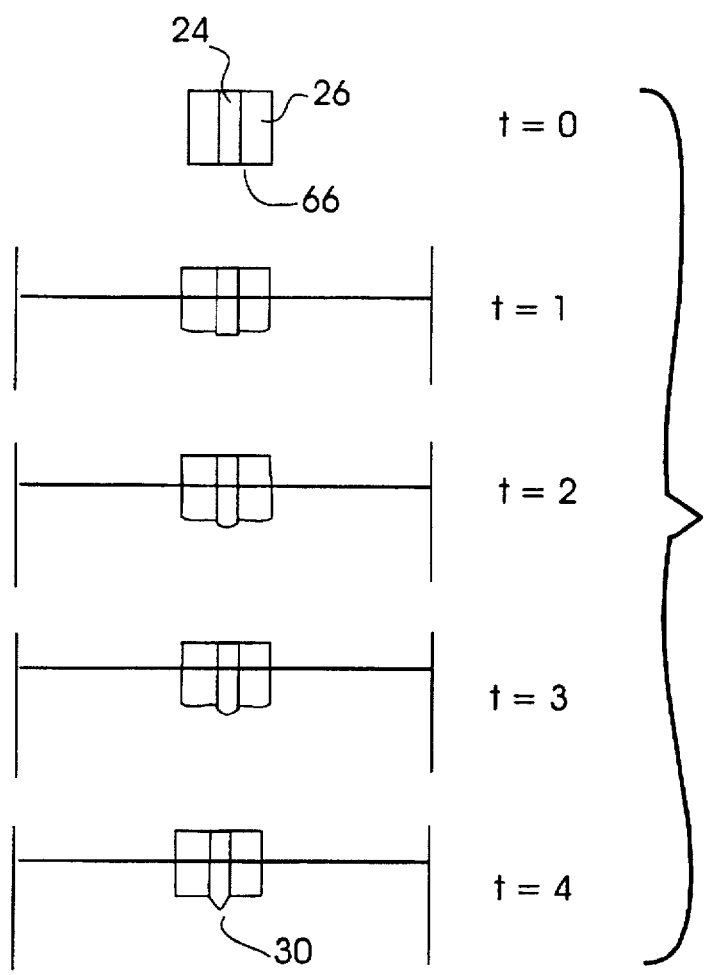
Figure 8

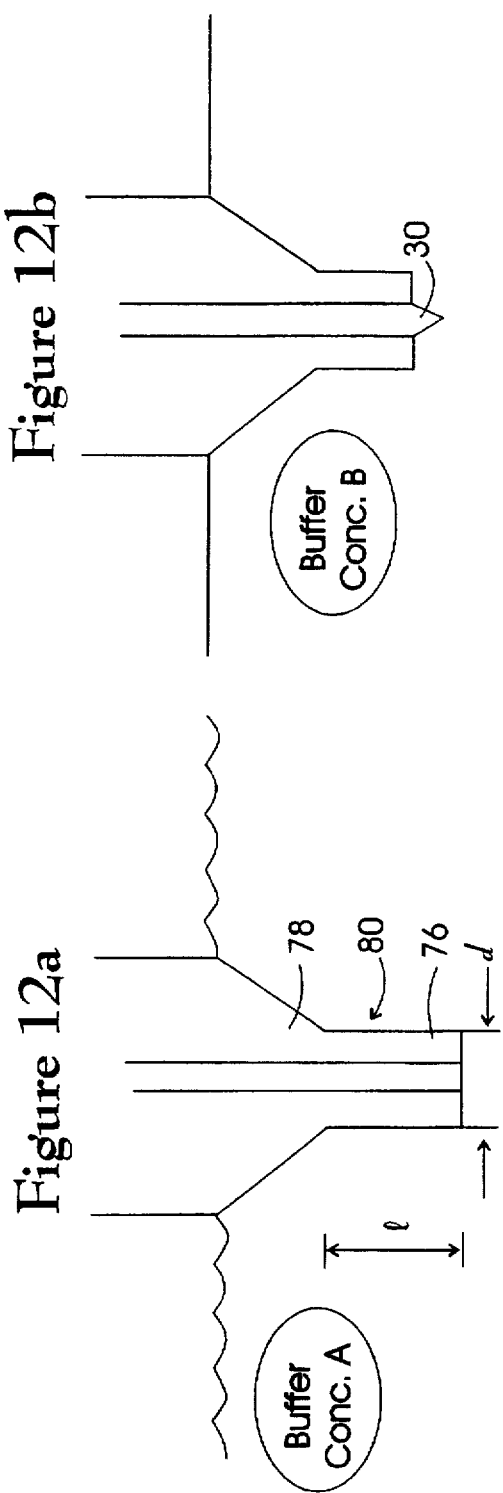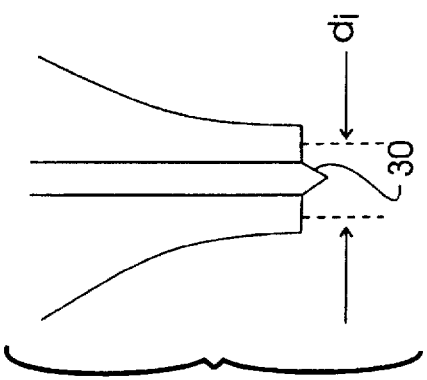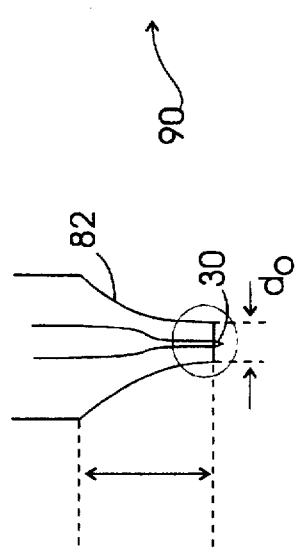

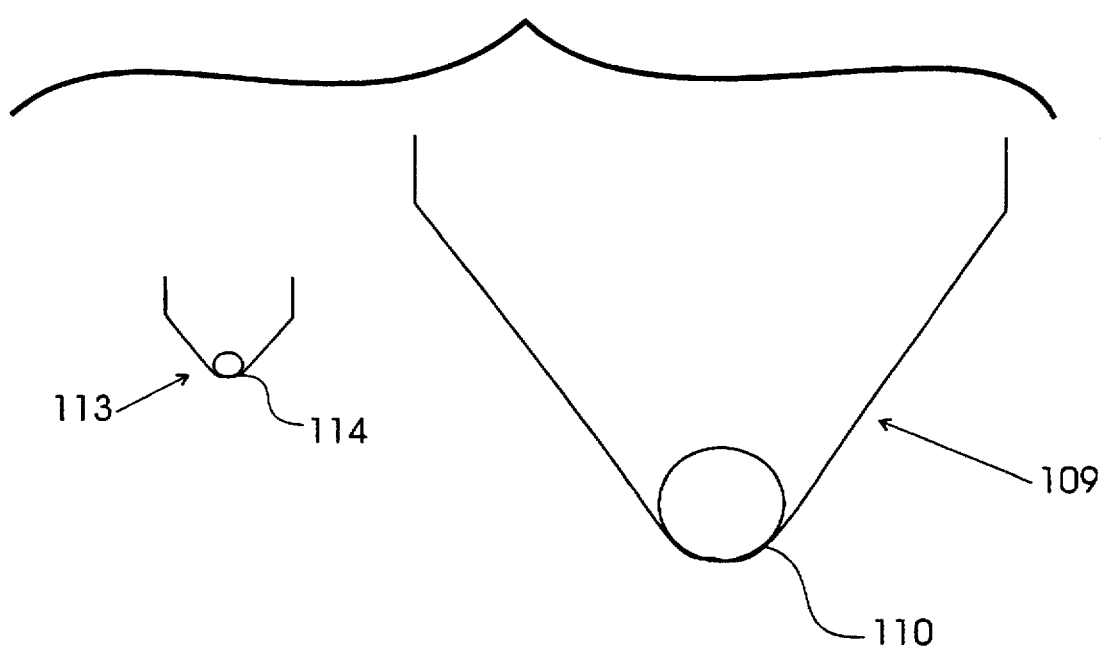

HIGH RESOLUTION FIBER OPTIC PROBE FOR NEAR FIELD OPTICAL MICROSCOPY AND METHOD OF MAKING SAME

CROSS-REFERENCE TO RELATED APPLICATION

This is a continuation-in-part of U.S. patent application Ser. No. 08/322,210, filed Oct. 13, 1994, entitled "Fiber Optic Probe for Near Field Optical Microscopy," by inventor Mohammed N. Islam, now U.S. Pat. No. 5,485,536.

BACKGROUND AND SUMMARY OF THE INVENTION

The present invention relates generally to near field optical microscopy (NSOM). More particularly, the invention relates to an improved fiber optic probe which provides dramatically improved efficiency and resolution.

The conventional compound microscope, now ubiquitous in the research laboratory, relies on illuminating the specimen by an external light source and using lenses in the far field to gather and focus the light. The far field corresponds to a specimen-lens distance of many optical wavelengths. There is, however, a limit to the resolving power of the conventional compound microscope. A physical phenomenon known as the diffraction limit prevents far field optical systems from resolving images smaller than roughly one-half the optical wavelength.

In 1928 Synge suggested that optical microscopy could overcome the diffraction limit of light by abandoning the far field and instead working in the near field. The near field exists in close proximity to the specimen, less than one optical wavelength. Using a tiny aperture and placing that aperture in the near field of the specimen, optical microscopy can achieve significantly greater resolving power. According to Synge's suggestion, the specimen is placed in the near field of the aperture, and light is delivered through the aperture so that it impinges upon and is reflected from or transmitted through the specimen. The reflected or transmitted light is then collected and viewed with a conventional optical microscope. In this way, only a tiny portion of the specimen is illuminated, hence all of the light entering the optical microscope corresponds to a single microscopic feature. This technique is thus capable of producing higher resolution than conventional optical microscopes.

A number of different implementations of Synge's idea have been experimented with. Pohl suggested that optical implementations could be achieved by coating the tip of a prism-like crystal. The first successful optical near field demonstration was by a group at Cornell which "taffy-pulled" glass micropipettes down to sub-wavelength diameters and defined the aperture by metallic overcoats. The taffy-pulled micropipette was highly inefficient, because the sub-wavelength diameter of the pipette choked off virtually all of the light, so that very little light would exit through the aperture to impinge upon the specimen.

Betzig and coworkers at AT&T Bell labs improved upon the Cornell taffy-pulled micropipette by replacing the glass micropipette with a fiber optic cable. Using the fiber optic cable Betzig and coworkers increased efficiency by three or four orders of magnitude. The Betzig device is manufactured by heating the fiber optic cable and then taffy-pulling it to sub-wavelength diameter, followed by a metallic overcoat.

While the Betzig device improves efficiency, a fundamental problem still remains. Although light will propagate efficiently down a fiber optic cable of standard diameter, the light becomes choked off when the diameter is reduced beyond a certain dimension. This is because light propagates in a waveguide-like fashion in the fiber optic cable of standard diameter. Specifically, light is confined to the inner core of the fiber optic cable by total internal reflection at the inner core-outer cladding boundary. When confined to the inner core in this fashion, light is said to be in the propagating mode.

However, when the diameter of the inner core is reduced, the propagating mode gives way to an evanescent mode. In the evanescent mode the optical energy is no longer truly propagating and is no longer confined to the fiber optic core, but rather a portion of the energy dissipates or escapes. The longer distance light must travel in this evanescent mode, the more energy that escapes.

It is a physical consequence of the taffy-pulling technique that the stretched fiber optic cable gets to be quite long before the diameter of the inner core becomes reduced sufficiently to form the aperture. Thus when a fiber optic cable is taffy-pulled to an extremely small aperture, the evanescent mode region is very long and efficiency is very poor. For example, a near field optical microscope (NSOM) with a resolution of 1000 Å has an efficiency at best of roughly $2 \times 10^{-4}$; by comparison, a NSOM with a resolution of 250 Å has an efficiency of typically less than $1 \times 10^{-6}$. The resolution plummets even further for smaller resolutions.

This degradation in resolution has significant consequences. Although extremely small apertures can be produced by taffy-pulling, the resulting efficiency is so low that virtually no usable light reaches the aperture and the specimen is not illuminated brightly enough to obtain a useful image.

The present invention overcomes the efficiency degradation problem by providing a light-emitting probe which has a rapidly tapered tip that protrudes longitudinally outwardly from the outer cladding of the fiber optic cable. The tapered tip comprises a portion of the inner core of the fiber optic cable. By extending the inner core longitudinally outwardly from the outer cladding, a very rapid taper can be fabricated by wet chemical etching. Because the inner core is rapidly tapered, light propagating along the inner core spends very little time in the evanescent mode before reaching the aperture. Therefore substantially more optical energy is delivered through the aperture to impinge upon the specimen.

Although other angular tapers may exhibit benefits of the invention, the presently preferred tip tapers at an acute angle on the order of about 15° to 60°.

There are numerous applications where the high efficiency optical probe of the invention will be invaluable. These include, materials characterization, super high density magneto-optical memory and optical lithography. In addition, with the enhancement described next below, the high efficiency optical probe can be modified to yield extremely high resolutions never before attained. With this high resolution enhancement, rapid optical DNA sequencing is made possible. It is expected that optical DNA sequencing will provide a thousand-fold decrease in sequencing time, as compared to conventional electrophoresis techniques.

The high efficiency optical probe is enhanced by applying a metallic overcoat to the tapered tip and then supercooling (e.g. using liquid helium or liquid nitrogen). The supercooled metallic overcoat is thus rendered highly conductive and able to confine the optical energy to a very small aperture. To prevent thermal creep the specimen may also be supercooled in this fashion.

When extremely high resolution is desired an alternate embodiment of the invention employs a dual portion tip comprising a reduced diameter intermediate region and a pointed tip that extends longitudinally beyond the outer cladding of the intermediate region. The intermediate region may be formed with a gradual taper, as by taffy-pulling, and the pointed tip may be formed by chemical etching. Significantly, the intermediate region is configured with its gradually tapering diameter so that light propagating in the intermediate region does so in a guided wave mode. Light propagating in the pointed tip propagates in an evanescent mode, preferably for fewer than five optical wavelengths. In essence, the pointed tip employs the principles of the invention through a geometry that is able to provide a much sharper point. This is because the tapered tip begins at a reduced diameter, due to the diameter reduction afforded by the tapered intermediate region. Starting at a smaller diameter, the etching process produces a sharper point than it does when starting with larger diameters.

For a more complete understanding of the invention in both the high efficiency and enhanced high efficiency, high resolution forms, reference may be had to the following specification and to the accompanying drawings.

BRIEF DESCRIPTION OF THE DRAWINGS

FIG. 7 is a schematic diagram illustrating one configuration for fabricating the fiber optic probe;

FIG. 8 is a series of views illustrating an alternate etching process, the views illustrating the fiber optic probe tip undergoing etching at different successive time intervals;

FIGS. 12A and 12B (collectively FIG. 12) illustrate a two-step etching process for manufacturing a probe according to the invention;

FIG. 13 depicts yet another probe configuration;

FIG. 14 is a diagrammatic view comparing the tapered tips of the embodiments of FIGS. 9 and 13, illustrating the nature of the sharper tip found in the FIG. 13 embodiment;

DETAILED DESCRIPTION OF THE PREFERRED EMBODIMENT

Figure 1:
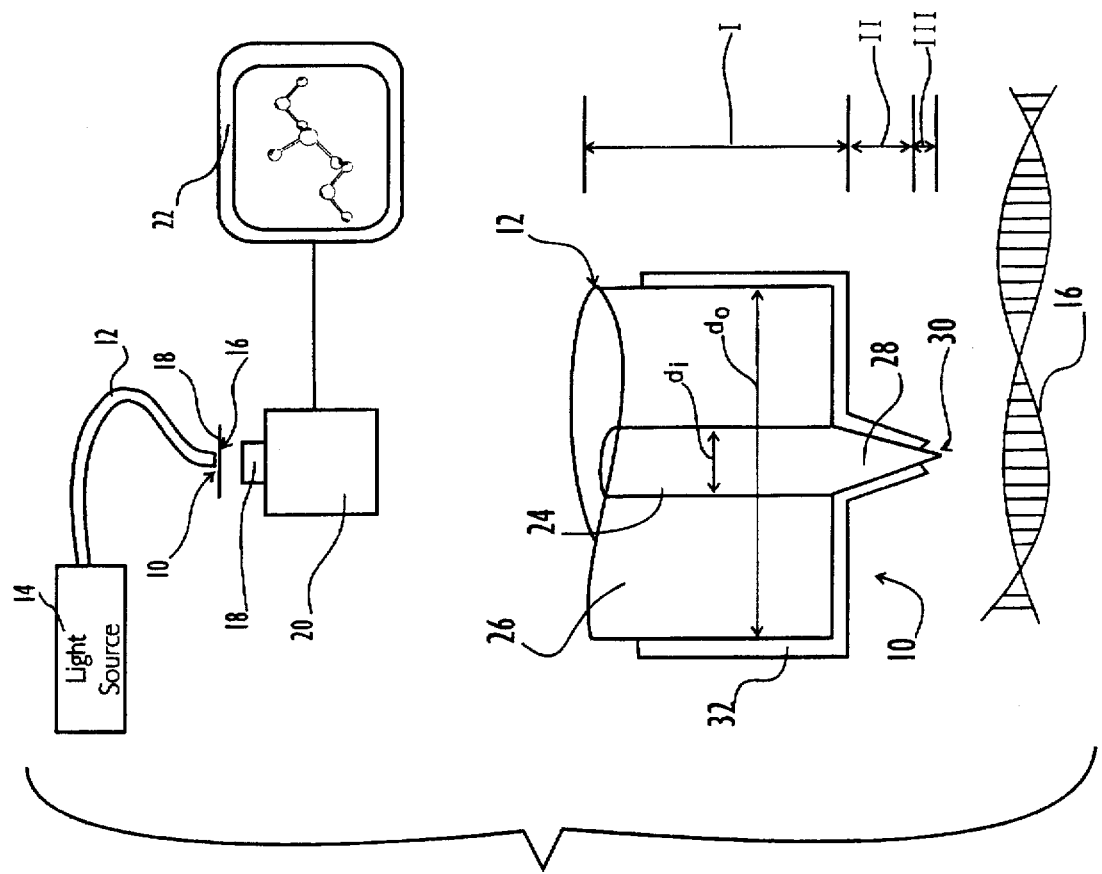
FIG. 1 is a diagrammatic illustration of the optical probe of the invention, including a detailed enlargement of the probe tip to show the details thereof.

Referring to FIG. 1, the high efficiency optical probe is illustrated in a near field optical microscopy application. The optical probe 10 is formed at the distal end of a fiber optic cable 12 which is in turn coupled at its proximal end to a light source 14. The optical probe is a light-emitting probe which projects a highly concentrated, extremely focused near field illumination onto a specimen 16, which may be mechanically positioned on a suitable carrier 18. Illumination from the probe is projected onto the specimen and thereupon collected by a suitable objective 18 positioned to collect either light reflected from the specimen or light transmitted through the specimen. The objective 18 may be a lens coupled to a photomultiplier 20, which may in turn be electronically connected to a monitor 22.

The fiber optic cable has an inner core 24 and an outer cladding 16 that concentrically encapsulates the inner core. The respective diameters of the inner core and outer cladding are such that light propagates in a guided dielectric mode along the length of the fiber optic cable 12. Referring to the enlarged view of the distal end of cable 12 (FIG. 1) the diameter of the outer cladding $d_o$ and the diameter of the inner core $d_i$ are shown.

The light-emitting probe has a tapered tip 28 that protrudes longitudinally outwardly from the outer cladding and that comprises a portion of the inner core 24. The tapered tip 28 defines a light-emitting aperture 30 at its tapered extremity. As will be more fully explained below, the tip 28 is tapered at an acute angle with respect to the longitudinal axis of the cable. An optically opaque coating 32 is applied to the tapered tip, and if desired, also to the outer cladding 26 at the distal end of cable 12. The opaque coating is not present at light-emitting aperture 30.

In the portion of the light-emitting probe where the outer cladding is fully present (region I) illumination from light source 14 propagates in a dielectric mode. In that portion of the probe where the tapered tip protrudes longitudinally outwardly from the outer cladding the mode of propagation changes. In region II the illumination propagates in a metallic mode, which gradually breaks down in region III into an evanescent mode.

Figure 2:
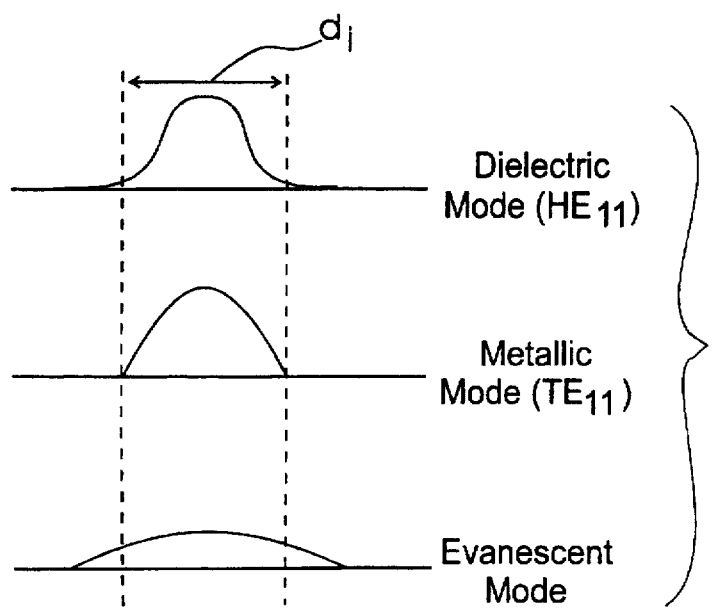
FIG. 2 is a series of graphs depicting the E-field intensity of the optic illumination in the dielectric mode region, the metallic mode region and the evanescent mode region of the probe of FIG. 1.

FIG. 2 illustrates these different modes of propagation. In FIG. 2 the diameter $d_i$ of the inner core (before taper) has been depicted by dashed lines. FIG. 2 illustrates the E-field intensity of the optical energy. In the dielectric mode, propagation conforms to the $HE_{11}$ mode. In the metallic mode propagation conforms to the $TE_{11}$ mode. The energy makes a transition from the $HE_{11}$ mode to the $TE_{11}$ mode quite efficiently because the field pattern overlay between the two modes is quite good, as illustrated in FIG. 2.

The probe design of the present invention seeks to minimize the distance over which light travels through the evanescent mode region. The efficiency of the probe is dramatically improved by eliminating the nonguiding dielectric mode region, which typically spans more than a hundred wavelengths in a probe of conventional taffy-pulled construction. This may be better understood by referring to FIGS. 3 and 4.

Figures 3, 4:
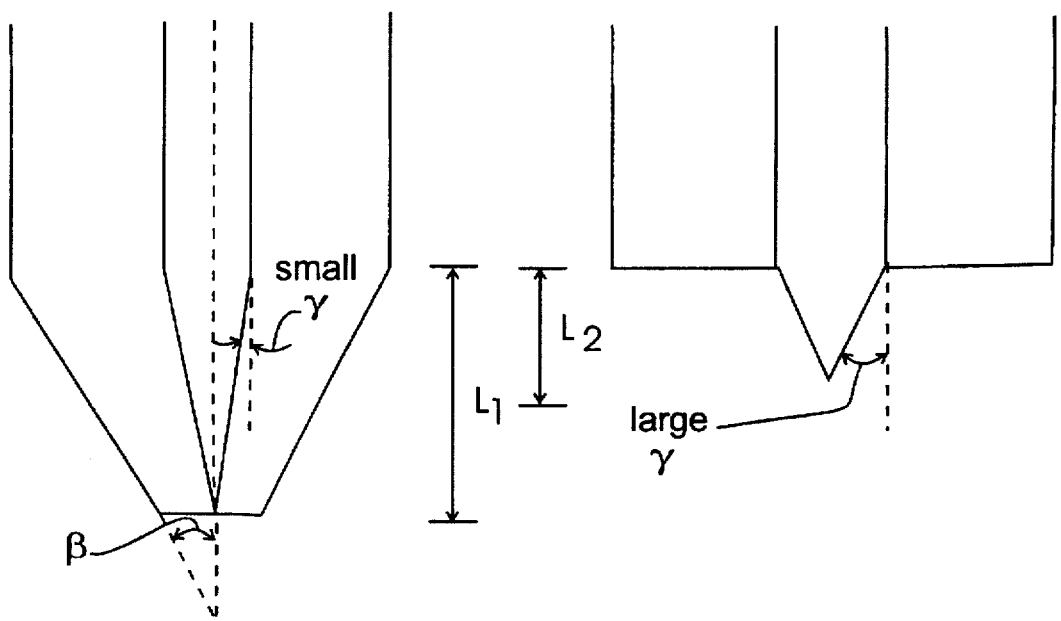
FIG. 3 is a cross-sectional view of a prior art probe manufactured using the taffy-pulled technique (not drawn to scale—taper occurs over hundreds of microns while the inner core of the fiber before taper is typically under 10 microns)
FIG. 4 is a cross-sectional view of the probe of the invention arranged next to FIG. 3 for comparison purposes.

In FIG. 3, a conventional taffy-pulled probe is illustrated. In FIG. 4 the probe of the present invention is illustrated. In FIG. 3 angle β defines the half angle of the cladding taper cone. γ defines the half angle of the core taper cone. In FIG. 4 γ, the half angle of the core taper cone is illustrated. Because the cladding is removed at the probe tip of the invention, no β angle has been illustrated. (if illustrated, β would be essentially 90° in FIG. 4).

With regard to the angle of core taper, the conventional taffy-pulled probe has a comparatively small γ angle of taper, whereas the invention of FIG. 4 has a comparatively large γ angle of taper. In comparing the respective angles of taper in FIGS. 3 and 4, it must be kept in mind that the important consideration is the γ angle of taper of the inner core. One should not, for example, compare the γ angle of FIG. 4 with the β angle of FIG. 3, as this would be a meaningless comparison between the inner core of one with the outer cladding of the other. In the taffy-pulled conventional probe of FIG. 3 there is the following relationship between the angle γ and the angle β: $\tan(\gamma) = d_i/d_o \times \tan(\beta)$, where $d_i$ is the core diameter and $d_o$ is the cladding diameter. For β less than about 20° and for $d_i=3$ μm and $d_o=125$ μm then γ is less than 1°. Even if β is increased to 60°, γ still works out to be less than 1°. With a γ angle on this 1° order of magnitude, the length of the taffy-pulled probe $L_1$ is quite long (many optical wavelengths). In contrast, because the γ angle of the invention is quite large (e.g. 20° or more) the probe length $L_2$ is quite short (e.g. fewer than 5 optical wavelengths). Thus, whereas the conventional taffy-pulled probe has an elongated adiabatic taper (i.e., a taper over many optical wavelengths), the probe of the invention avoids an elongated adiabatic taper. This means that light propagating down the fiber spends very little time traversing the lossy adiabatic region. It is in this lossy adiabatic region that much of the optical energy is lost in the conventional taffy-pulled probe. The probe of the invention achieves the desired light-emitting aperture size with a significantly shorter probe length, thereby allowing the probe to deliver optical energy at between two to three orders of magnitude brighter than conventional probes. To appreciate the significance of this, consider that in photographic terms, one order of magnitude yields improved sensitivity of between 3 to 4 f-stops and two orders of magnitude yields improved sensitivity of between 6 to 7 f-stops.

Manufacturing the High Efficiency Probe

Figure 5A:
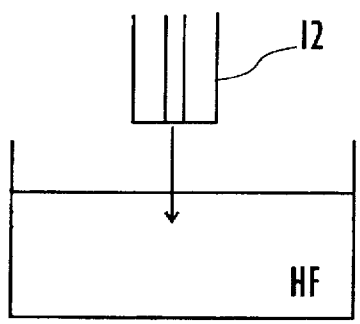
FIGS. 5A–5H (collectively FIG. 5) are a series of diagrammatic views illustrating the method of manufacturing the probe.
Figure 5B:
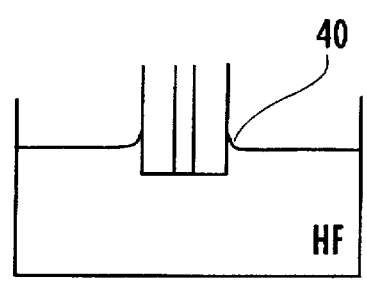

To produce a tapered tip with a γ angle on the order of about 15° to 60°, a wet chemical etching technique may be used. The wet chemical etching technique is illustrated in the series of FIGS. 5A–5H. In FIG. 5A the distal end of fiber optic cable 12 is dipped into an etching Solution of buffered hydrofluoric acid (HF). This is illustrated in FIG. 5B. The liquid hydrofluoric acid at the intersection of the air and specimen rises slightly due to surface energetics to form a meniscus 40. The most rapid removal of material occurs in the region just below the meniscus.

Figure 5C:
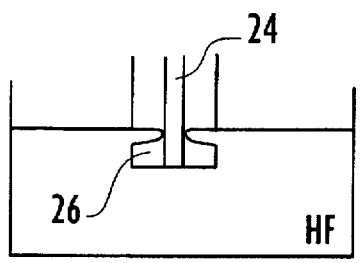
Figure 5D:
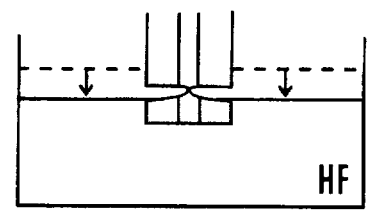

Thus as depicted in FIG. 5C, the outer cladding 26 is etched away leaving the inner core 24 exposed. Then, as illustrated in FIG. 5D, the hydrofluoric etching solution is partially evaporated away at a controlled rate, so that the inner core 24 is etched to defined the acute angle of the tapered tip. In FIG. 5D the dotted line shows the original level of hydrofluoric acid before controlled evaporation.

Figure 5E:
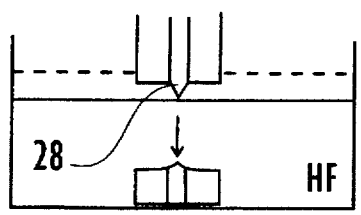
Figure 5F:
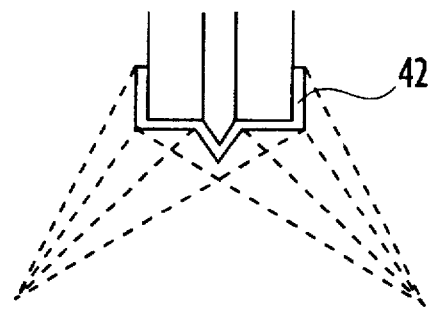
Figure 5G:
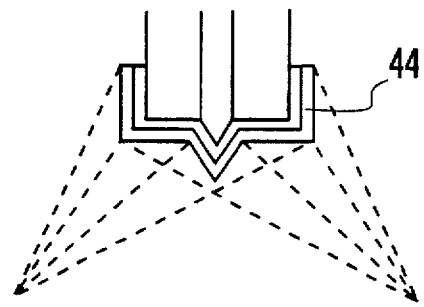
Figure 5H:
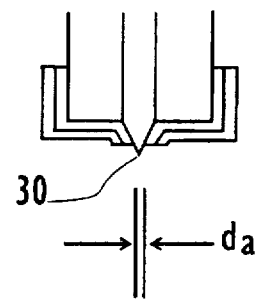

In FIG. 5E the hydrofluoric acid level is finally evaporated below the tapered extremity of the tip 28. Note that a portion of the fiber optic cable removed during etching may separate and fall to the bottom of the etching tank under its own weight. Next, the probe tip is removed from the etching solution, washed of any residual etching solution and then provided with a metallic overcoat. Any suitable optically opaque coating may be used for this purpose. The presently preferred embodiment uses an aluminum overcoating. To improve the adhesion of the aluminum to the fiber optic material, a very thin layer of nickel may be applied as illustrated in FIG. 5F, where the nickel layer is depicted at 42. The metallic layer can be deposited by filament evaporation, by ion beam (sputtering), by electron beam evaporation or by chemical deposition. Thereafter, as illustrated in FIG. 5G the aluminum overcoating layer 44 is applied. Preferably the optically opaque coating is a metal with high conductivity at low temperatures. The aluminum or other metallic layer can be added using a process similar to that used to apply the metallic layer in FIG. 5F. Thus, in the alternative, platinum may be used in place of aluminum. Finally, in FIG. 5H, the metal overcoating is removed from the tapered extremity to form the light-emitting aperture 30. The light-emitting aperture 30 has a diameter $d_a$ which, in some applications, may be on the order of 10 Å. This aperture may be formed by masking during metal evaporation, or by electrochemical etching to remove the metal at the tip (e.g. the tip end can be burned or "blown" off by applying a large voltage). Alternatively, angle deposition may be used towards the end with the tip masked off. To clean the light-emitting aperture or to make fine adjustments in its size, a low current electrochemical etching may be employed.

Supercooling Tip for Improved Resolution

Referring back to FIG. 1, in region II the electromagnetic field of the illumination is largely captured (metallic mode propagation) by the optically opaque cladding. However, for apertures smaller than about 200 Å, leakage of the electromagnetic field into the cladding starts, to play a significant role, limiting the ultimate resolution at room temperature to about 120 Å. At room temperature, the electromagnetic field skin depth for visible light is about 65 Å in aluminum. Thus at room temperatures the aluminum metallic coating is no longer fully opaque. To overcome the skin depth limitations, the tip can be supercooled to enhance conductivity of the metal overcoat and to reduce the Johnson noise. Preferably the specimen under examination and the probe tip should be held at the same temperature to avoid thermal drift. With the conductivity enhanced by supercooling, the raw resolution of our fiber optic probe can be on the order to 10 Å, limited by the opacity of a few atomic layers in the metallic coating (i.e. where the bulk approximation begins to break down). Although aluminum is currently used for the overcoat, silver, gold or platinum may be more appropriate at lower temperatures because the conductivity of these materials increased faster with decreasing temperature. The optimum overcoat material choice depends on the conductivity as well as the adherence of the material to the fiber optic cable when cooled.

Figure 6:
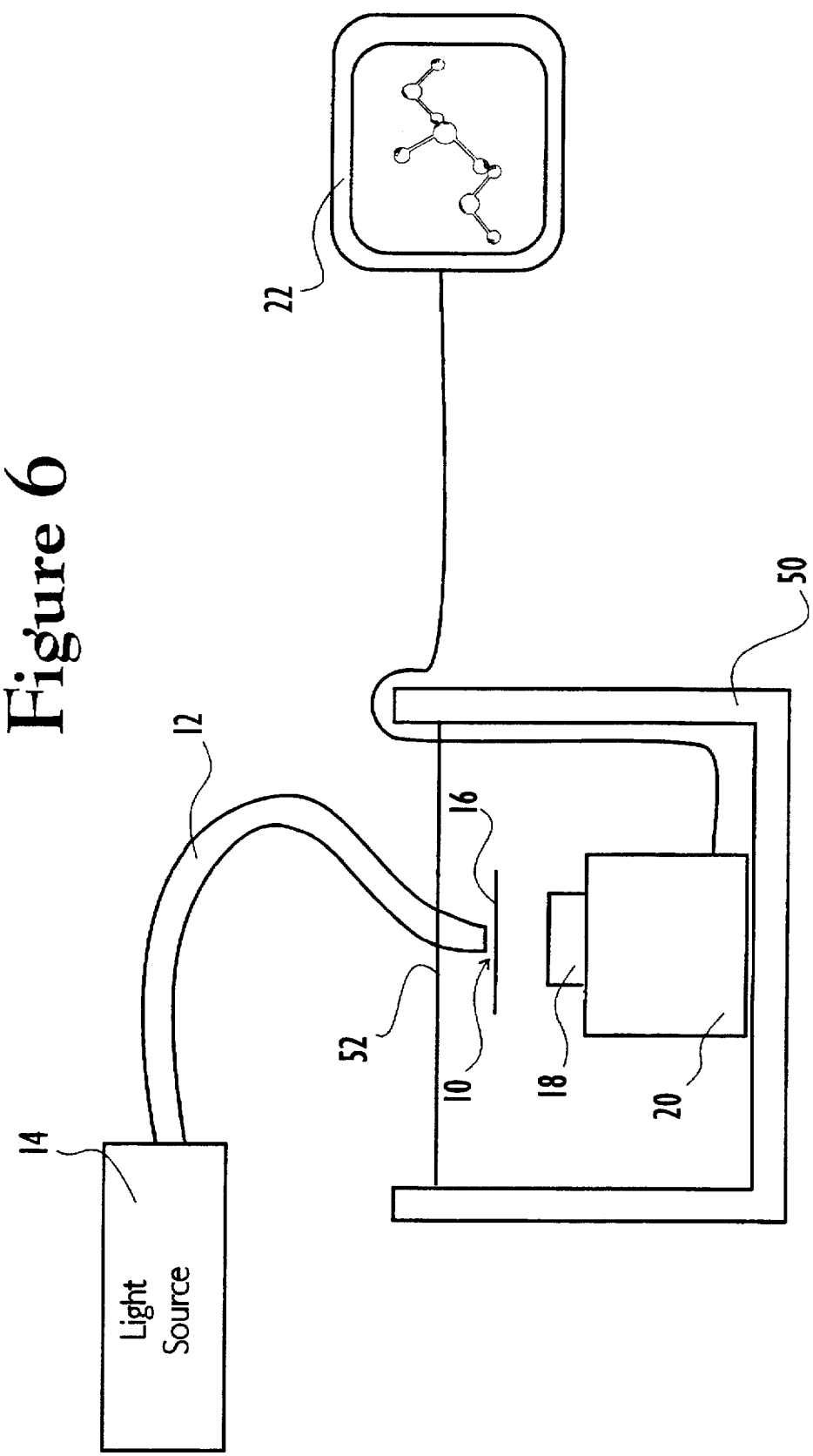
FIG. 6 illustrates one embodiment of the optical probe which includes a supercooling arrangement for producing extremely high resolution.

Referring to FIG. 6, a high resolution, high efficiency optical probe embodiment is illustrated. The optical probe 10 of the invention, as well as the specimen 16 are placed in an insulated cryogenic crucible 50 which may be-filled with liquid nitrogen or liquid helium 52. The fiber optic cable 12 associated with probe 10 is connected to light source 14 as described above. Depending on the physical positioning requirements of the light gathering optics, the objective 18 and photomultiplier 20 may also be disposed within crucible 50. Photomultiplier 20 is coupled to the monitor 22 as described above. For more information regarding the technology involved in total immersion of the specimen in liquid nitrogen see J. Mou, J. Yang and Z. Shao, *Review of Scientific Instruments*, June 1993, Vol. 64, p. 1483. In the alternative, a cryostat microscope system can be used to maintain the specimen and probe at supercooled temperatures. A suitable system is available from Oxford Instruments, Concord, Mass., e.g., Ultra-High Vacuum CryoSTM System. For additional information regarding cryostat systems see R. G. Grober, T. G. Harris, J. K. Trautman, E. Betzig, W. Wegscheider, L. Pfeifer and K. West, *Applied Physics Letter*, Mar. 14, 1994, Vol. 64, p. 1421.

Some Possible Applications

The high efficiency optical probe of the invention is useful in a number of applications. One application is optical memory based on near field magneto-optics. Magneto-optical memory has the advantage of being nonvolatile, making this memory ideal for mobile applications, such as avionics and shipboard applications. Magneto-optical memory is also ideal for automation and process control systems which may be subject to periodic power outages.

Conventional magneto-optic devices exhibit an undesirably slow access time due to the low efficiency of currently available optical probes. The probe of the present invention improves efficiency by two to three orders of magnitude, which may improve the access time of magneto-optical memory by similar orders of magnitude.

Another application for the high efficiency probe of the invention is in microlithography. Microlithography is used in the fabrication of semiconductor chips, such as dynamic random access memories (DRAMs). The manufacture of integrated circuits by microlithography involves employing a mask that is etched with the desired circuit design. Silicon wafers which are eventually diced up into chips, are coated with a light sensitive material or resist. Light is then shined through the mask onto the wafer, exposing areas of the resist. Washing the wafer with a solvent dissolves the unwanted resist and leaves a copy of the mask design on the wafer.

As circuit designs become tighter, to achieve higher storage densities, the use of visible light with conventional technology becomes troublesome, as conventional visible light technology provides insufficient resolution and insufficient optical energy. Some have experimented with shorter wavelength energy, such as X-rays, but these techniques are problematic to control. The optical probe of the present invention allows optical fabrication techniques to be used, but with much higher resolution. This is because the optical probe can produce a much smaller diameter beam of light while still providing sufficient illumination intensity.

Another particularly important application of the present high efficiency probe is in high speed DNA sequencing and diagnostics. The DNA sequencing application requires both high efficiency and high resolution. Thus, the preferred embodiment for this application is that illustrated in FIG. 6, or the equivalent, to produce supercooled conditions that yield optical opacity of the coating adjacent the light-emitting aperture. The high optical output and extremely fine resolution afforded by the probe of the invention allows the near field scanning optical microscope to optically examine the DNA molecule at a sufficient resolution to perform DNA sequencing. Due to the probe's high efficiency and high resolution, the NSOM-based sequencer will have an overall throughput roughly two orders of magnitude greater than sequencing devices available today. This is expected to reduce the sequencing cost per base pair by a factor of 1,000 and to achieve sequencing rates on the order of 100 kilobases per hour or better. The probe of the invention thus represents a significant advance over heretofore available DNA sequencing techniques, particular when one considers that at the current technologically possible sequencing rate, it will take an estimated 300 years to complete the entire human genome sequencing project. The present invention is expected to cut this time by three orders of magnitude or more.

From the foregoing, the optical probe of the present invention offers high efficiency not heretofore achieved. By fabricating the optical probe according to the principles of the invention, efficiency is improved between two to three orders of magnitude. Although the applications of this technology are many, the higher efficiency afforded by this probe makes the probe ideal for super high density magneto-optical memory devices, optical lithography and near field optical microscopy. When implemented in a supercooled mode, the fiber optic probe delivers extremely high resolution in addition to high efficiency, making the probe suitable for DNA sequencing using near field optical microscopy.

As an alternate to the previously described fabrication techniques, a one-step selective etching process can be used. The presently preferred one-step selective etching process involves cleaving the fiber optic cable to form a flat edge and then wet-chemical etching the probe by dipping that flat edge into chemical etchant. In the previously described fabrication techniques a gradual withdrawal of the probe or evaporation of the etchant controls the taper angle. This can lead to a rough, tapered surface that may produce undesired light scattering. The preferred one-step selective etching technique of FIG. 8 relies on differences in the chemical makeup of the inner core and the outer cladding, without meniscus level control, to selectively control the etching angle.

Specifically, the etching angle is determined in the one-step selective etching process by controlling the fiber composition through doping. Different fiber optic materials etch at different rates, depending on the doping of the material, the constituents of the etching solution, the temperature of the etching solution and the etching time. Referring to FIG. 7, an example of a system for performing the one-step selective etching process is illustrated. The fiber optic cable 12 comprising inner core 24 and outer cladding 26 is dipped into a buffered hydrofluoric acid solution 60. The temperature of the solution is held constant or controlled by temperature controller 62 and pH of the solution is monitored by pH monitor 64. The relative doping of the inner core and outer cladding is controlled during cable manufacture. See comparison of different fiber types in Table I below which shows exemplary data values.

TABLE I

| Numerical Aperture | Tip Cone Angle (2γ) |
|---|---|
| 0.12 | 110° |
| 0.17 | 70° |
| 0.18 | 60° |
| 0.20 | 45° |
| 0.24 | 35° |

By doping inner core and outer cladding differently an index of refraction difference is established. This index of refraction difference is responsible for causing the fiber optic cable to act as a light waveguide. The buffered solution 60 is controlled by introducing a measured amount of a buffering agent 61 as through valve 63.

In the presently preferred embodiment a buffering agent consisting of ammonium fluoride ($NH_4F$) is introduced into a hydrofluoric acid (HF) and water (H₂O) mixture. The concentration of the buffering agent can be altered during the fabrication of the probe to achieve different etching rates, as desired. For example, the probe illustrated in FIGS. 12a and 12b (described more fully below) may be etched using different buffer concentrations. For example, to achieve the shape illustrated in FIG. 12a a first buffer concentration A is used; to achieve the subsequent configuration illustrated in FIG. 12b a different concentration B is used. As an example of those concentrations see Table II below.

TABLE II

| Concentration | NH₄F | HF | H₂O |
| --- | --- | --- | --- |
| Concentration A | 3 Parts | 1 Part | 1 Part |
| Concentration B | 7 Parts | 1 Part | 1 Part |

It is important to closely control the temperature of the etching solution. The presently preferred embodiment performs etching at 20° C. The etching result desired is then obtained by suitable selection of the etching time. In this regard, etching time and etching solution temperature are reciprocally related.

The present one-step selective etching process capitalizes on the doping differences between the inner core and outer cladding to achieve a selective etching. Referring to FIG. 8, the selective etching process is illustrated through a sequence of time intervals designated t=0 . . . t=4. At time t=0 the fiber optic cable is cleaved flat as at 66. The flat end is then immersed in the buffered hydrofluoric acid etching solution and the etching process is allowed to proceed. Because the inner core and outer cladding have been differently doped, the etching process occurs at different rates in these two materials. As illustrated at time t=1, the outer cladding begins to etch away faster than the inner core. In the successive time intervals t=2, t=3 and t=4, the outer cladding is etched away to produce the pointed tip 30 (at time t=4). The tip is etched in this fashion such that the acute angle of the tip is tapered rapidly as in the previously described embodiments. Preferably, the angle of taper is such that light propagating through the cable traverses the tapered tip in an evanescent mode for fewer than 5 optical wavelengths.

Figure 9:
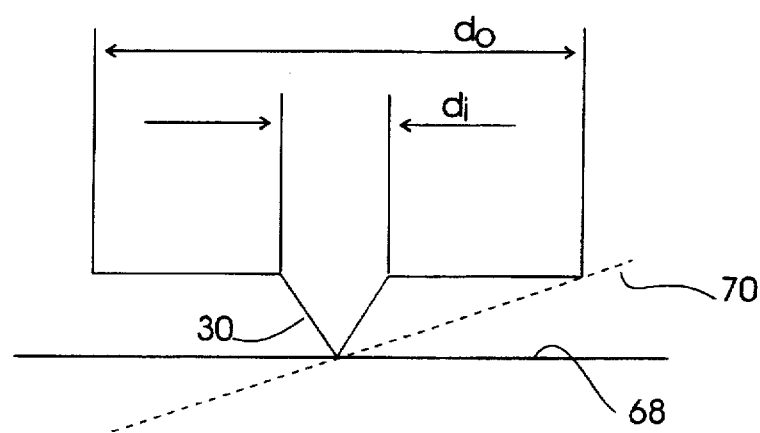
FIG. 9 is a detailed view of the probe produced by the process of FIG. 8.

FIG. 9 shows an enlarged view of the tapered tip 30 as produced by the one-step etching process. In this embodiment the inner core has a diameter $d_i$ on the order of 5 microns and the outer cladding has a diameter $d_o$ on the order of 125 microns. When the probe is used to examine a surface such as surface 68 the tapered tip is preferably placed in contact with the surface so that the probe is essentially perpendicular to the surface. As illustrated by dashed line 70, when the probe is placed in contact with an angled surface, the outer cladding can make contact with the surface, possibly interfering with operation of the probe. Notwithstanding this geometric restriction, the probe of FIG. 9 is simple to fabricate and the tip 30 is mechanically stable, because of its shortness. Also, the short tip provides good thermal contact for cooling. The probe of FIG. 9 has a very low mechanical resonant frequency (low Q).

Figure 10:
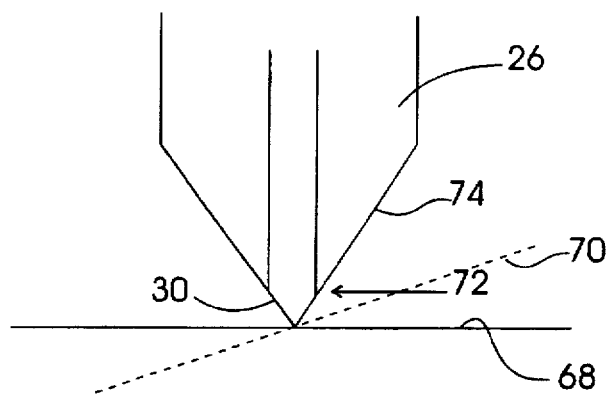
FIG. 10 is an alternate probe configuration.

In applications where the probe of FIG. 9 might encounter restrictions, or in applications where the probe must be used at different angles, the alternate probe configuration of FIG. 10 may be employed. In the embodiment of FIG. 10 the tapered tip 30 still extends longitudinally outwardly beyond the furthest extent of the outer cladding 26. In FIG. 10 the furthest extent of the outer cladding is depicted at 72. However, instead of being flatly configured as the embodiment of FIG. 9, the outer cladding is tapered as at 74. Preferably the taper 74 follows the same taper angle as the tip 30, such that the probe resembles the tip of a sharpened lead pencil. As illustrated in FIG. 10, the probe works equally well with flat surfaces such as surface 68 or inclined surfaces such as surface To fabricate the probe of FIG. 10 a change in the meniscus level and controlled evaporation rate during wet selective chemical etching may be used. Alternatively, the tapered outer cladding can be formed by micropolishing, micromachining or electrochemical polishing. In some applications oil may be placed on the tip in selective areas to modify or avoid the surface polishing operation.

Aside from having the advantage of working on angularly disposed surfaces, the probe of FIG. 10 is easier to coat with a metallic overcoat.

Figure 11:
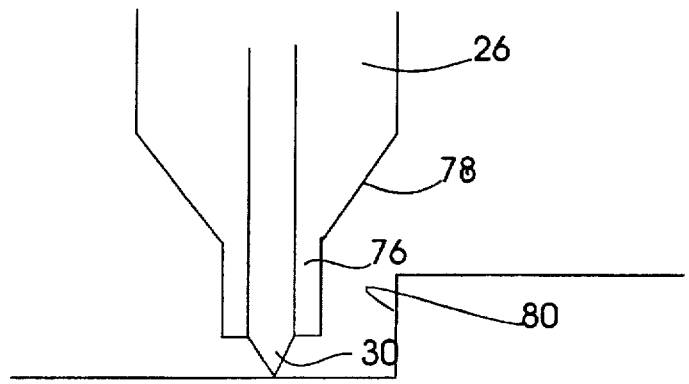
FIG. 11 is yet another probe configuration.

In yet another embodiment of the invention illustrated in FIG. 11 a two-step etching process is employed. The probe of FIG. 11 provides a tapered tip that extends longitudinally beyond the furthest extent of the outer cladding as in the case with the probes previously described. Differing from the other probes, the probe of FIG. 11 has a stepped outer cladding that includes a reduced diameter annular region 76 and an intermediate frusto-conically tapered region 78. The probe of FIG. 11 has the advantage of being able to work at wider angles (similar to that of the probe of FIG. 10) and it can also work into close proximity of corners such as corner 80. Preferably the intermediate region surrounded by the annular portion 76 should be made only long enough to accommodate the expected geometry of the sample, as long intermediate regions can tend to be more sensitive to mechanical vibrations.

FIGS. 12a and 12b illustrate the method of manufacturing the probe of FIG. 11. In these figures the probe is first etched (FIG. 12a) to form the intermediate region 80, including the use of meniscus control or evaporation rate control to form the frusto-conically tapered portion 78. After this has been done the tapered tip is formed (FIG. 12b) using any of the techniques described above, including the one-step selective etching process shown in FIGS. 7 and 8. In a typical application the annular portion 76 of the intermediate region may have a diameter d of approximately 5–20 microns and a length l of approximately 20–100 microns.

The probe of FIG. 11 has the advantage of having a reduced mass at the end. This gives the probe a higher mechanical resonant frequency (higher Q). It is possible to adjust the Q of the probe by adjusting the length or width of the intermediate region In some applications an extremely fine tip may be desired. The embodiment of FIG. 13 provides such a tip. The tip comprises an intermediate tapered region 82 and a tapered tip 30. The tapered tip 30 extends longitudinally outwardly beyond the furthest extent of the outer cladding (as described in the previous embodiments). The difference is that the intermediate tapered region 82 is formed by a taffy-pulling technique, which causes the outer cladding and inner core to both become stretched and therefore reduced in diameter.

The probe of FIG. 13 is produced by a taffy-pulling operation to form the intermediate region 82. The intermediate region is then cleaved to form a flat edge (comparable to the flat edge 66 of FIG. 8) and one of the above-described etching processes is used to form the tapered tip. In FIG. 13 the tapered tip is shown in the enlarged inset 90. Note that the tapered tip, as in the other embodiments, extends beyond the longitudinal extent of the outer cladding. The diameter $d_i$ of the inner core at the tapered tip is on the order of 1 micron.

The outer diameter $d_o$ of the outer cladding at the tapered tip is on the order of 5–10 microns. The tapered intermediate region 82 may be on the order of 200–300 microns.

In comparing the geometry of the tip 30 of FIG. 13 with that of the other embodiments, such as FIG. 9, the tapered tips 30 are similar in geometric configuration. Both are designed so that light propagating from the cable to the aperture traverses the tapered tip in an evanescent mode for fewer than 5 optical wavelengths. The tips are different in that the tip of FIG. 9 tapers from a diameter equal to the standard diameter of the fiber optic inner core (e.g. 5 microns). The tip of the FIG. 13 embodiment tapers from a diameter equal to the reduced diameter of the inner core (e.g. 1 micron). Thus, although each of the embodiments employs a tapered tip that reduces light propagation in the evanescent mode, the embodiment of FIG. 13 achieves a much sharper tip. The reason for this may be attributed to the tip fabrication process.

Although a perfectly sharp pointed tip is the desired result, chemical etching techniques and other comparable techniques inherently produce a tip that is slightly rounded at the end. This is a consequence of the way the etching process takes place at the surface of the tip material. This is illustrated in FIG. 14 in which the tips of the embodiments of FIGS. 9 and 13 are compared. The embodiment of FIG. 13, depicted generally at 113 has a tip with a rounded spherical radius corresponding to inscribed sphere 114, whereas the tip of the FIG. 9 embodiment, depicted at 109 has a rounded tip characterized by the inscribed sphere 110. The radius of sphere 110 is considerably larger than that of sphere 114.

The sharper tip of the FIG. 13 embodiment offers several advantages. First, the tip is subject to less noise from any mode mixing or mode beating. The tapered intermediate region helps to strip out any higher order transverse modes in the fiber. These modes can couple to the fundamental mode leading to noise if not stripped out. Second, the sharper tip offers higher resolution and higher efficiency. There are several reasons for this. The sharper tip affords lower loss because light spends less time traveling in the cut-off waveguide mode. Comparing the tips in FIG. 14, the tapered tip 113 might be on the order of 1 micron in length and 1 micron in diameter; the tip 109 might be on the order of 5 microns in length and 5 microns in diameter. Thus light propagating through tip 113 spends less time traveling in the cut-off waveguide mode.

Another reason for higher resolution and higher efficiency of the sharper tip is that it produces higher light intensity. This is because the same energy input to the fiber is concentrated over a smaller cross sectional area upon exiting the light-emitting aperture. In this regard, the sharper taper acts as a better lens to focus the light. Also, the sharper tip provides less impedance mismatch as the light propagates from the cable to the light-emitting aperture. Having less mismatch produces less reflection and hence more light output. Comparing tips 109 and 113 in FIG. 14, the gradual reduction in inner core diameter provides less abrupt of a transition when the propagating light encounters the tapered tip. In contrast, light propagating through tip log must undergo a more abrupt change as it propagates from the standard diameter inner core to the tapered tip and out through the aperture.

With regard to the embodiment of FIG. 13, a similar advantage might be obtained by starting with a fiber optic cable that has a smaller inner core diameter to being with. However, starting with a larger inner core and then tapering down to a smaller diameter has the advantage of being easier to physically couple with. The fiber optic cable must be connected to a light source such as a laser and a larger diameter inner core is easier to couple to than a smaller diameter one.

Figure 15:
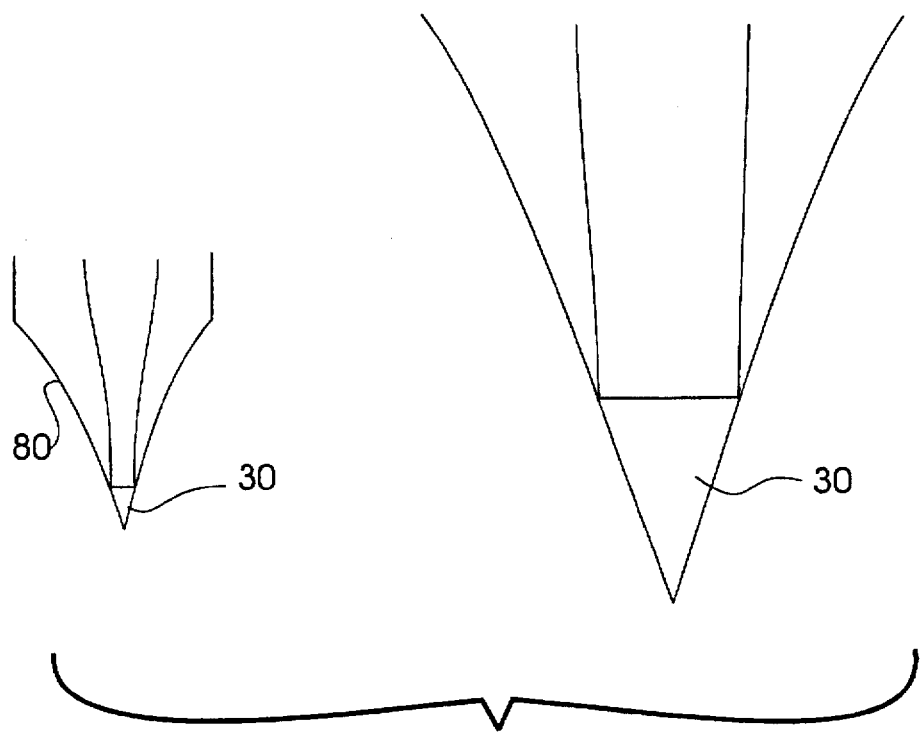
FIG. 15 is yet another, embodiment of the optical probe similar to the embodiment of FIG. 13 but having the outer cladding etched down to the core size at the tip.

FIG. 15 shows another embodiment of the probe having a reduced diameter intermediate portion. In this embodiment a similar method is used to pull and etch the probe to achieve the pointed tip 30. Differing from the embodiment of FIG. 13, the probe of FIG. 15 is also etched to reduce or remove the cladding in the intermediate region 80 so that the outer cladding is gradually reduced down to the core size at tip 30.

The advantage of the probe of FIG. 15 is that it is easier to perform angle coating in evaporating or sputtering machines and it can have a large angle between the tip and the sample during use.

In discussing the previous embodiments, and in particular the embodiments having a reduced diameter intermediate portion, a metallic overcoat layer has not been illustrated. This has been done largely to simplify the illustrations and also because some applications may not require a metallic coating.

Figure 16:
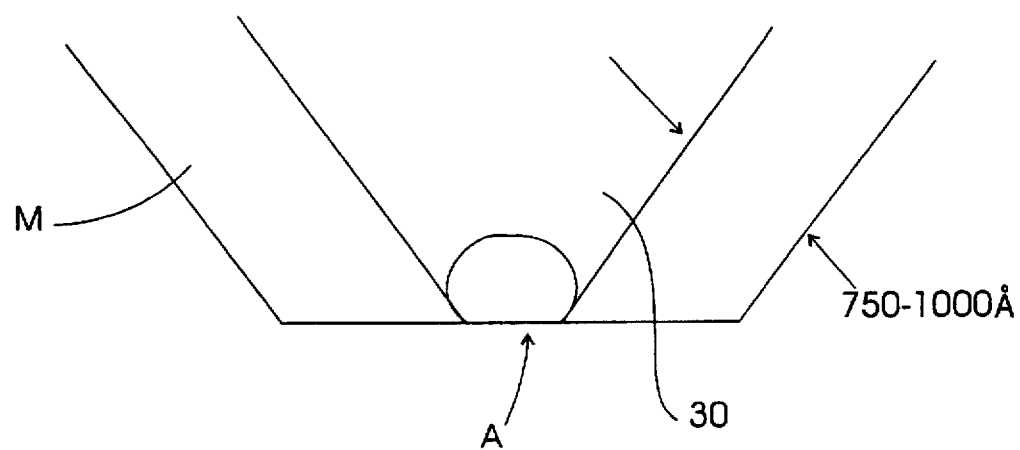
FIG. 16 is a cross-sectional view showing the preferred configuration of the metal overcoat at the tapered tip.

Nevertheless, it will be understood that the metallic overcoat layer may be employed to prevent light from leaking out prior to reaching the light-emitting aperture. The presently preferred configuration for applying the metallic coating is shown in FIG. 16. The light emitting aperture A is not coated. The metallic coating M is applied to tip 30 as illustrated. Note that the metallic coating does not extend beyond the distal-most end of the tip (that is, it is does not extend substantially beyond the aperture A). This may be done by abrading or crashing the tip after the metallic overcoat has been applied. Alternatively, a photoresist overcoat mask can be applied before applying the coating, to prevent the metallic coating from extending beyond the tip or covering the aperture.

Figure 17:
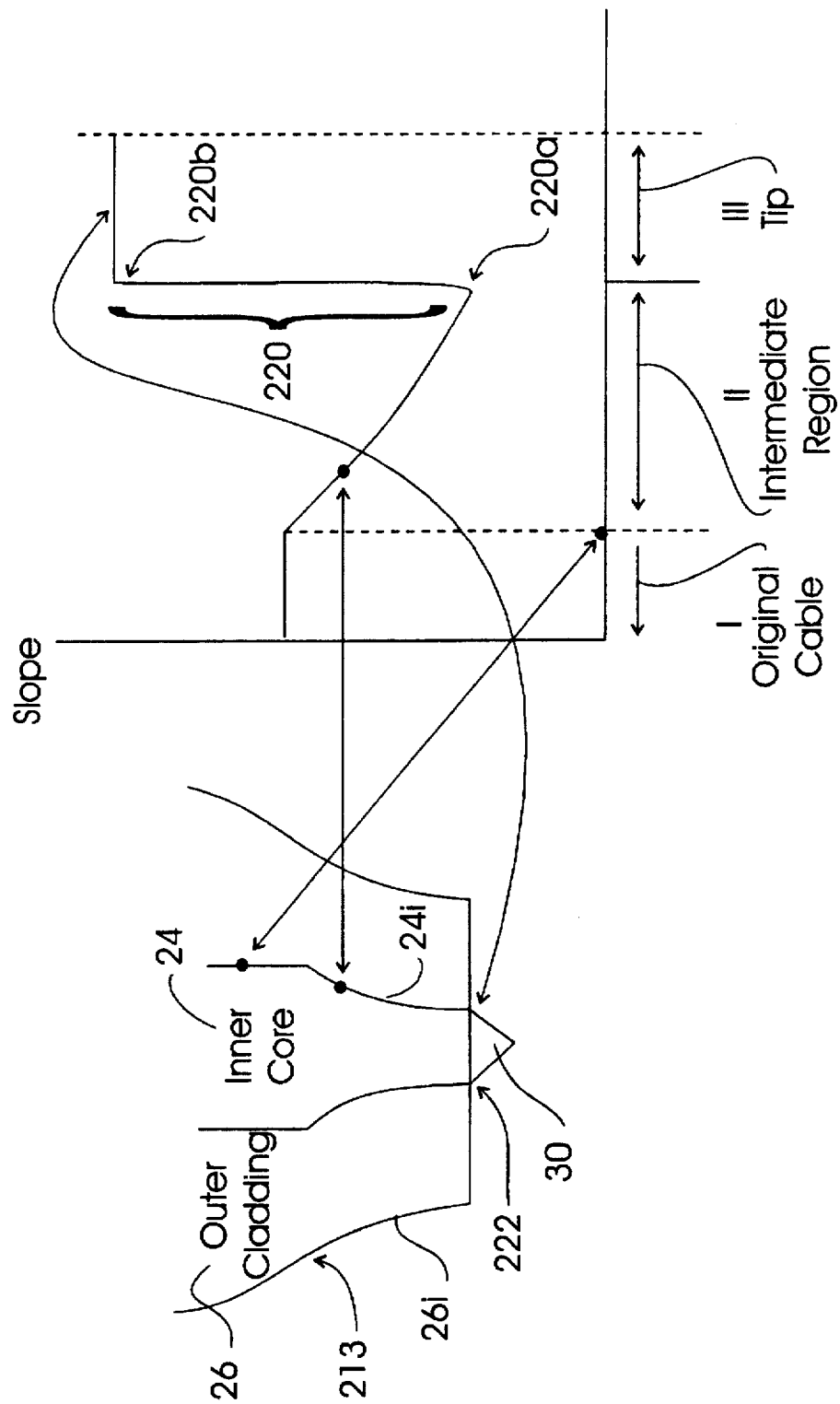
FIG. 17 is a graph illustrating the discontinuous taper of the inner core at the locus or junction at which the intermediate region ends and the tapered tip begins.

FIG. 17 illustrates an important aspect of the presently preferred probe with reduced diameter intermediate region. Referring to FIG. 17, a partial cross-sectional view of the probe of FIG. 13 has been illustrated at 213. Note the tapering of the inner core 24 and outer cladding 26 as at 24i and 26i. Also note the tapered tip 30. The graph of FIG. 17 shows the slope of the inner core as a function of position. The graph depicts a zero slope corresponding to the inner core of the original cable. This is shown in region I. The gradually reducing diameter of intermediate region 24i is shown by that portion of the graph denoted by II. Due to the taffy-pulling operation in this intermediate region, the slope is not constant and is thus illustrated by a nonlinear, curved line segment. The slope corresponding to the pointed tip is shown by III in the graph. Note the slope of tip 30 is much steeper than the intermediate portion, hence the value of the slope in this region is higher than the slope in the intermediate region. Because the taper of tip 30 is a substantially constant taper, the graphical depiction of this slope is a substantially straight, horizontal line segment. In actual fabrication the edges will be slightly rounded, hence the transition or jump will not be as sharp as illustrated here.

Note the slope discontinuity between regions II and III, appearing as an abrupt change in slope as at 220. The slope jumps discontinuously from 220a to 220b. Graphically, this jump signifies an abrupt change in the taper of the inner core. This abrupt change in taper occurs at the locus 222, that is, at the juncture where the intermediate region ends and the tapered tip 30 begins.

The discontinuous taper is an indication of a primary benefit of the probe with reduced diameter intermediate portion. The discontinuity lies at the junction or locus between the intermediate portion (through which light propagates in a guided wave mode) and the sharply pointed tip (through which light propagates in an evanescent mode). By making a transition at this locus to a much sharper taper, the tip 30 is made short, preferably shorter than five optical wavelengths. At the same time, the tip commences its taper at a much smaller diameter than the diameter of the original inner core. The tip's point is thus inherently much sharper when fabricated by etching, as was illustrated in FIG. 14.

In considering the probe having a reduced diameter intermediate portion, it is the reduced diameter of the inner core that is principally important. Although the diameter of the outer cladding may also be reduced, as a nature consequence of a taffy-pulling operation, it is the diameter of the inner core that must be properly controlled. As previously pointed out, the diameter of the inner core is gradually reduced by a pulling operation, but not so reduced as to degrade light propagation in a guided wave mode. On the other hand, the diameter of the portion of the inner core forming the pointed tip is reduced quite rapidly, so that guided wave mode propagation gives way to evanescent mode propagation. However, as the tip is kept quite short, the losses attendant to evanescent mode propagation are substantially minimized.

While the invention has been described in its presently preferred embodiment, it will be understood that certain modifications can be made to the basic design without departing from the spirit of the invention as set forth in the appended claims.

What is claimed is:

1. A high efficiency, high resolution optical probe comprising:
   a fiber optic cable having an inner core and an outer cladding, said cable having a distal end which defines an optical probe;
   said optical probe having a reduced diameter intermediate region and a tapered tip that defines a light transmissive aperture at its tapered extremity;
   said intermediate region comprising a portion of said inner core and said outer cladding, the inner core and outer cladding of said intermediate region being tapered to define a reduced diameter locus;
   said tapered tip comprising a portion of said inner core commencing at said reduced diameter locus and protruding longitudinally outwardly to extend beyond said outer cladding;
   said intermediate region and said tapered tip having different rates of taper, the rate of the taper of said inner core at said reduced diameter locus and the rate of the taper of the inner core of said tip being different from one another and discontinuous at said reduced diameter locus;
   said rate of taper of said inner core at said reduced diameter locus being such that light propagating in said intermediate region propagates in a guided wave mode; and
   said rate of taper of said inner core at said tip being such that light propagating in said tapered tip propagates in an evanescent mode for fewer than five optical wavelengths.

2. The probe of claim 1 wherein the inner core at said tip has an angle of taper on the order of about fifteen (15) degrees to sixty (60) degrees.

3. The probe of claim 1 wherein the inner core at said tip has an angle of taper selected to achieve a balance between minimizing the impedance mismatch due to reflection and minimizing the optical signal loss due to propagation in the evanescent mode, such that the optical energy transmitted through the aperture is substantially maximized.

4. The probe of claim 1 wherein said intermediate region is formed by taffy-pulling.

5. The probe of claim 1 wherein said tip is formed by wet chemical etching.

6. The probe of claim 1 further comprising a metallic overcoat layer disposed on tip except at said light transmissive aperture.

7. The probe of claim 6 wherein said metallic overcoat does not extend substantially beyond the tapered extremity of said tip.

8. The probe of claim 1 wherein said fiber optic cable has a proximal end for coupling to a light source and wherein said light transmissive aperture is a light-emitting aperture.

9. The probe of claim 1 wherein said fiber optic cable has a proximal end for coupling to a light sensor and wherein said light transmissive aperture is a light-admitting receiver.

10. A high efficiency, high resolution optical probe comprising:
    a fiber optic cable having an inner core of a first diameter and an outer cladding, said cable having a distal end which defines an optical probe;
    said probe having a tapered tip comprising at least two portions, a first portion that gradually reduces in diameter to a second diameter smaller than said first diameter and a second portion that protrudes longitudinally outwardly from said first portion and extends beyond said outer cladding;
    said first portion supporting light propagation in a guided wave mode and said second portion supporting light propagation in an evanescent mode;
    said first and second portions defining a discontinuous rate of taper such that said second portion tapers to a point in fewer than five optical wavelengths.

11. The probe of claim 10 wherein the inner core of said second portion has an angle of taper on the order of about fifteen (15) degrees to sixty (60) degrees.

12. The probe of claim 10 wherein the inner core of said second portion has an angle of taper selected to achieve a balance between minimizing the impedance mismatch due to reflection and minimizing the optical signal loss due to propagation in the evanescent mode, such that the optical energy transmitted through the aperture it substantially maximized.

13. The probe of claim 10 wherein said first portion is formed by taffy-pulling.

14. The probe of claim 10 wherein said second portion is formed by wet chemical etching.

15. The probe of claim 10 further comprising a metallic overcoat layer disposed on at least all of said second portion except at the tip.

16. The probe of claim 15 wherein said metallic overcoat does not extend substantially beyond the tapered extremity of said tip.

17. The probe of claim 10 wherein said fiber optic cable has a proximal end for coupling to a light source and wherein said second portion defines a light-emitting aperture.

18. The probe of claim 10 wherein said fiber optic cable has a proximal end for coupling to a light sensor and wherein said second portion defines light-admitting aperture.

19. A method of manufacturing an optical probe comprising the steps of:
    providing a fiber optic cable having an inner core and an outer cladding;

taffy-pulling said cable to form a reduced diameter portion terminating in a distal end;

removing the distal endmost portion of said outer cladding, leaving said reduced diameter inner core protruding longitudinally beyond the outer cladding;

forming the protruding inner core into a tapered tip terminating in a light transmissive aperture;

wherein said reduced diameter portion is of a dimension such that light propagating in said reduced diameter portion propagates in a guided wave mode; and wherein said tapered tip is formed at a taper angle such that light propagating in said tapered tip propagates in an evanescent mode for fewer than five optical wavelengths.

20. The method of claim 19 further comprising forming said tapered tip by wet chemical etching.

21. The method of claim 19 further comprising forming said tapered tip by exposing said distal end to an etching environment and leaving said distal end exposed to said etching environment until said outer cladding is substantially etched away, leaving the inner core to protrude longitudinally outwardly from said outer cladding.

22. The method of claim 19 further comprising cleaving said cable to form said distal end.

23. The method of claim 19 further comprising:

selecting differently doped first and second light transmissive materials such that the first and second materials have different indices of refraction and such that the first material etches at a slower rate than said second material when exposed to an etching environment;

using said first and second material to form said fiber optic cable, the inner core comprising said first material and the outer cladding comprising said second material;

cleaving said cable to form a distal end;

exposing said distal end to an etching environment;

leaving said distal end exposed to said etching environment until said outer cladding is substantially etched away leaving the inner core to protrude longitudinally outwardly from said outer cladding to define a tip;

leaving said distal end exposed to said etching environment until said tip is etched away to define a tapered tip.

24. A high efficiency optical probe comprising:

a fiber optic cable having an inner core and an outer cladding that concentrically encapsulates the inner core, the cable having a proximal end for coupling to a light source and having a distal end which defines a light-emitting probe;

said light-emitting probe having a reduced diameter intermediate region adjacent said distal end;

said light-emitting probe having a tapered tip that protrudes longitudinally outwardly from said outer cladding of said reduced diameter intermediate region, the tapered tip comprising a portion of said inner core that extends longitudinally beyond the outer cladding;

said tapered tip defining a light-emitting aperture at its tapered extremity, the tip being tapered at an acute angle with respect to the longitudinal axis of the cable, said acute angle being such that light propagates through said tip in the evanescent mode for fewer than five optical wavelengths.

25. The probe of claim 24 wherein said intermediate region has a gradually reduced diameter outer cladding of a diminishing and tapering diameter.

26. The probe of claim 24 wherein said intermediate region has a stepwise reduced diameter outer cladding having an annular portion of a diameter smaller than the average diameter of said fiber optic cable.

27. The probe of claim 24 wherein said intermediate region has an inner core of gradually diminishing diameter.

28. The probe of claim 27 wherein said gradually diminishing diameter is formed by taffy-pulling the fiber optic cable.

29. The probe of claim 24 wherein the inner core of said fiber optic cable within said intermediate region is of a diameter such that light propagates through said intermediate region in a guided wave mode.

30. The probe of claim 24 wherein said tip tapers at an acute angle is selected to achieve a balance between minimizing the impedance mismatch due to reflection and minimizing the optical signal loss due to propagation in the evanescent mode, such that the optical energy transmitted through the aperture is substantially maximized.

31. A high efficiency optical probe comprising:

a fiber optic cable having an inner core and an outer cladding that concentrically encapsulates the inner core, the cable having a proximal end for coupling to a light source and having a distal end which defines a light-emitting probe;

said light-emitting probe having a reduced diameter intermediate region adjacent said distal end;

said light-emitting probe having a tapered tip that protrudes longitudinally outwardly from said outer cladding of said reduced diameter intermediate region, the tapered tip comprising a portion of said inner core that extends longitudinally beyond the outer cladding;

said tapered tip defining a light-emitting aperture at its tapered extremity, the tip being tapered at an acute angle on the order of about fifteen (15) degrees to sixty (60) degrees with respect to the longitudinal axis of the cable;

said tapered tip having a metallic overcoat disposed on substantially all of said tip except for said light-emitting aperture.

32. The probe of claim 31 wherein said intermediate region has a gradually reduced diameter outer cladding of a diminishing and tapering diameter.

33. The probe of claim 31 wherein said intermediate region has a stepwise reduced diameter outer cladding having an annular portion of a diameter smaller than the average diameter of said fiber optic cable.

34. The probe of claim 31 wherein said intermediate region has an inner core of gradually diminishing diameter.

35. The probe of claim 34 wherein said gradually diminishing diameter is formed by taffy-pulling the fiber optic cable.

36. The probe of claim 31 wherein the inner core of said fiber optic cable within said intermediate region is of a diameter such that light propagates through said intermediate region in a guided wave mode.

37. The probe of claim 31 wherein said tip tapers at an acute angle is selected to achieve a balance between minimizing the impedance mismatch due to reflection and minimizing the optical signal loss due to propagation in the evanescent mode, such that the optical energy transmitted through the aperture is substantially maximized.

\* \* \* \* \*